US007138743B1

(12) United States Patent
Sondergaard et al.

(10) Patent No.: US 7,138,743 B1

(45) Date of Patent: Nov. 21, 2006

(54) SOLID AND LIQUID HYBRID CURRENT TRANSFERRING BRUSH

(75) Inventors: Neal A. Sondergaard, Severna Park, MD (US); William A. Lynch, Philadelphia, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/985,074

(22) Filed: Nov. 5, 2004

(51) Int. Cl.
*H01R 39/18* (2006.01)
*H02K 13/00* (2006.01)
*H01R 39/00* (2006.01)

(52) U.S. Cl. ........................................ 310/248; 310/251

(58) Field of Classification Search ................ 310/243, 310/248, 249, 252, 245; 439/11, 12
See application file for complete search history.

(56) References Cited

U.S. PATENT DOCUMENTS

| | | | | |
|---|---|---|---|---|
| 3,837,229 A * | 9/1974 | Stiles et al. | ................... | 74/5 R |
| 4,027,183 A * | 5/1977 | Hatch | ......................... | 310/219 |
| 4,027,184 A * | 5/1977 | Hurley | ....................... | 310/219 |
| 4,168,446 A * | 9/1979 | Hatch | ......................... | 310/219 |
| 4,186,321 A * | 1/1980 | Marshall | ...................... | 310/178 |
| 4,241,273 A * | 12/1980 | Hatch | ......................... | 310/219 |
| 4,266,154 A * | 5/1981 | Marshall | ...................... | 310/219 |
| 4,314,171 A * | 2/1982 | Hatch | ......................... | 310/219 |
| 4,358,699 A * | 11/1982 | Wilsdorf | ...................... | 310/251 |
| 4,415,635 A * | 11/1983 | Wilsdorf et al. | ............ | 428/611 |
| 6,628,036 B1 * | 9/2003 | Lynch et al. | ................ | 310/242 |
| 6,903,484 B1 * | 6/2005 | Kuhlmann-Wilsdorf | .... | 310/239 |
| 6,913,476 B1 * | 7/2005 | Yean et al. | ................. | 439/178 |

* cited by examiner

*Primary Examiner*—Darren Schuberg
*Assistant Examiner*—Erik Preston
(74) *Attorney, Agent, or Firm*—Jacob Shuster

(57) ABSTRACT

The moving slip ring surface of electrical machinery transfers electrical current by contact thereof with liquid metal directly or through the tips of a plurality of closely spaced brushes positioned along the bottom of a housing under pressure within which the liquid metal is contained. The brush tips are respectively connected to lower ends of fibers electrically interconnected within the housing and exposed to the liquefied metal received and retained within the housing. According to one embodiment, the liquefied metal is retained within containment material filling the housing for contact exposure of the fibers therewith. According to another embodiment, exposure of the fibers to the liquefied metal within the housing is effected by entry of the liquefied metal into hollow brush tubes connected to and extending from the bottom of the housing, through which stem portions of the fibers extend to the brush tips.

14 Claims, 1 Drawing Sheet

FIG. 1
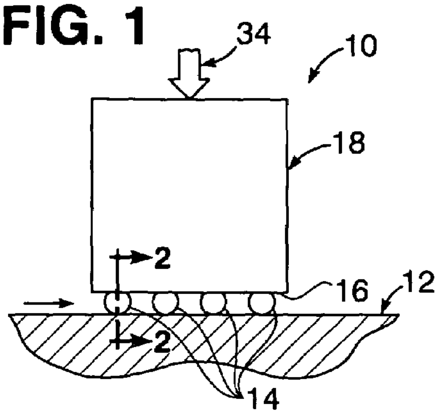
FIG. 2
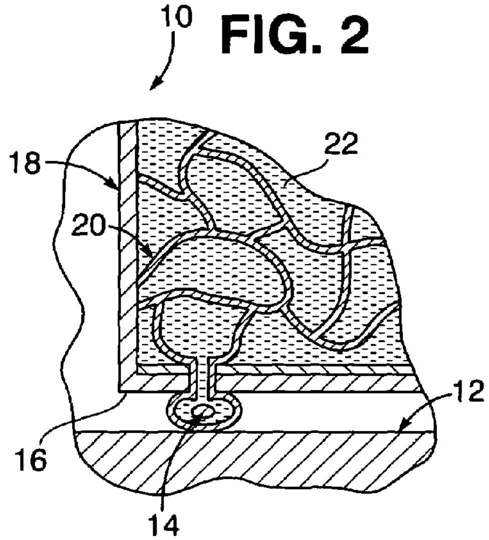
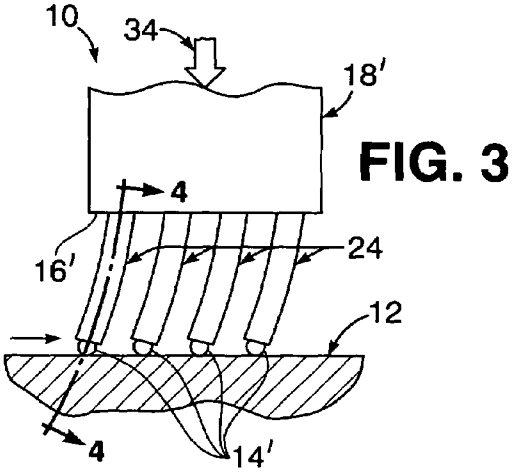
FIG. 3
FIG. 4
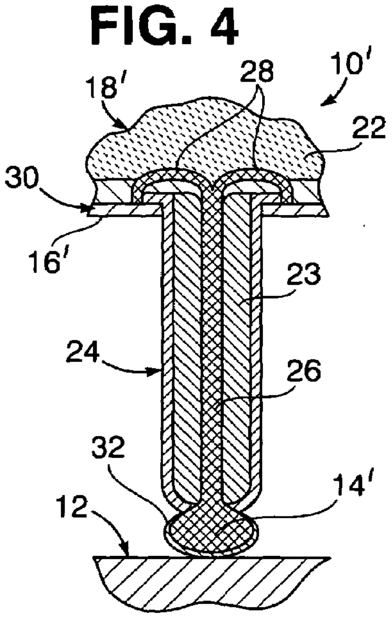
FIG. 5
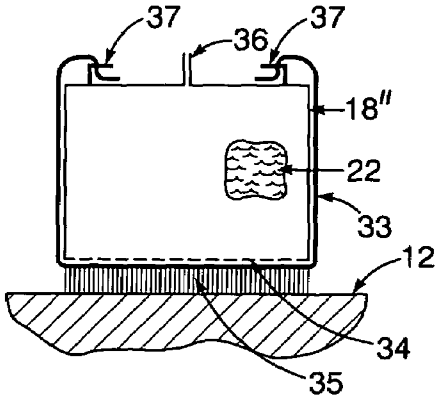

SOLID AND LIQUID HYBRID CURRENT TRANSFERRING BRUSH

The present invention relates to the transfer of electrical current across a moving surface in an electric current collecting device.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Currently many slip-ring brushes are made from solid carbon. Metal fiber brushes are generally known for providing a large number of electrical contact points on a rotor running surface, thereby providing low contact voltage drop. However such metal fiber brushes, supported by holders to which they are attached by soldering, as disclosed for example in U.S. Pat. No. 6,628,036, to Lynch, are readily deformed by high external forces which may arise in an electrical motor type of environment because of current and magnetic field interactions. Excessive loading of such metal fiber brushes when applied to the running rotor surface results in excessive brush spreading distortion, sometimes referred to as splay. While brushes may be made stronger by using larger fibers, this would result in fewer contact points and poor following of imperfections in the rotor surface. The use of liquid metal brushes has also been proposed so as to increase surface coverage and significantly reduce losses, which however introduces other problems requiring control over atmospheric environment and fluid stability. Much of the latter referred to problems are avoided by the present invention for a more efficient electrical current collector.

SUMMARY OF THE INVENTION

Pursuant to the present invention, a physical type of container is provided for retention therein of liquefied conductive metal 23 sealingly enclosed within a housing from which porous brush components project into contact with a moving conductive slip-ring surface of electrical machinery for transfer of electrical current thereto under a light contact pressure applied to the housing. During operation of the machinery, the slip-ring surface is exposed to some of the liquefied metal at tips of the brush components in contact with the moving surface, while the slip-ring is atmospherically exposed to the liquefied metal. The quantity of liquid metal exposed to the atmosphere within the machinery is thereby limited so as to significantly increase the life of the current collector.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 1 is a side elevation view of one embodiment of a hybrid brush assembly in a current collector position over a moving surface;

FIG. 2 is a partial section view taken substantially through a plane indicated by section line 2—2 in FIG. 1;

FIG. 3 is a partial side elevation view corresponding to that of FIG. 1, showing another embodiment of a hybrid brush assembly pursuant to the present invention; and FIG. 4 is a partial section view taken substantially through a plane indicated by section line 4—4 in FIG. 3.

FIG. 5 is a side elevation view of a hybrid brush assembly in a moving surface current collector position, pursuant to another embodiment.

DETAILED DESCRIPTION OF THE PREFERRED EMBODIMENT

Referring now to the drawing in detail, FIGS. 1 and 2 illustrate a hybrid brush assembly 10, constructed in accordance with one embodiment of the present invention, positioned in contact with a moving slip ring surface 12 within an electric current collector region of electrical machinery. The brush assembly 10 has closely spaced pore openings through which liquid metal at a lower bottom 16 of a reservoir housing 18 is applied to the slip-ring running surface 12 through fiber tips 14 in contact therewith as shown in FIG. 1.

A small amount of the liquid metal from the reservoir housing 18 enters the tips 14 through fibers 20 connected thereto, made of a low-melting point metallic alloy or a porous liquid containment material 22 such as aero-gel foam. The liquefied metal completely fills the chamber within the housing 18 about the fibers 20. When the brush assembly 10 is fabricated, the liquid metal is drawn into the containment material 22 by vacuum.

According to another embodiment of the present invention as shown in FIGS. 3 and 4, a hybrid brush assembly 10' is positioned above the slip ring surface 12. The brush assembly 10' has a support housing 18' with a lower bottom 16' from which a plurality of hollow brush tubes 24 extend. Brush tips 14' are connected to lower ends of the brush tubes 24 for contact with the slip ring surface 12. As shown in FIG. 4, each of the hollow brush tubes 24 encloses an evacuated chamber formed about an optional fiber stem 26 to increase conductivity. The fiber stems 26 within the tubes 24 are exposed to liquefied metal 23 withdrawn from the liquid containment material 22 filling a reservoir housing 18' thereabove. Such fiber stems 26 are electrically interconnected through conductive attachments 28 with an electrically conductive base plate 30 positioned on the bottom 16' of the housing 18'. The fiber tips 14' environmentally exposed outside of the tubes 24 at their lower ends may be provided with a protective inert material coating 32, such as varnish to protect the liquid metal absorbed within the tips 14' when the brush assembly 10' is in storage prior to use. Additionally, the fiber stem 26 may be removed from the hollow tube 24 which is completely filled with the liquid metal 23 to produce a liquefied metal drop held in place by combined actions of surface tension and vacuum.

Since the liquid metal 23 is well contained and sealed within the housing 18' and within the brush tubes 24 as hereinbefore described, there is very little reaction thereof with the environmental atmosphere so as to minimize reaction of the liquid metal 23 with the atmosphere. Furthermore, the brush assembly 10 or 10' is effective to perform transfer of current to the surface 12 under a very light pressure force 34 applied to the housing 18 or 18' as diagrammed in FIGS. 1 and 3. Friction related losses and wear rates are accordingly very low.

In accordance with other embodiments of the present invention, the liquefied metal containment material 22 within the housing 18 or 18' may be formed from carbon or silica aerogel for example, within which the liquid metal 23 is retained by capillarity and vacuum. Conductive metal or non-conductive micro-tubes made of polymers for example could also be used in association with a conductive base interface in contact with the liquid metal 23. According to still other alternative embodiments, the liquid metal containment tubes 24 may be replaced by fabric strips 33 as shown in FIG. 5, with button holes at each strip end through which the strips are attached to retention hooks 37 and stretched over a current collector region of the reservoir housing 18". The liquid metal passes through a screen 34 forming a bottom of the housing 18" and then between fabric micro fibers 35 making contact with the slip-ring surface 12. The liquid metal reservoir within the housing 18" may be refilled with the material 22 or pressurized through a filling port 36 connected to the top of the housing 18".

Obviously, other modifications and variations of the present invention may be possible in light of the foregoing teachings. It is therefore to be understood that within the scope of the appended claims the invention may be practiced otherwise than as specifically described.

What is claimed is:

1. A brush assembly comprising:

a sealed container configured to retain a liquefied metal that is drawn into and retained within the container under vacuum;

a plurality of brushes connected to the container and exposed to the liquefied metal while being held in contact with a moving surface, wherein each of the brushes is a tubular chamber configured to conduct some of the liquefied metal from the container onto the moving surface upon an application of pressure to the container, and wherein each of the brushes has a tip configured to deposit a liquefied metal drop onto the moving surface, the liquefied metal drop being held within the tip by surface tension and vacuum.

2. The brush assembly of claim 1, wherein the tubular chambers each include an internal stem that extends to the tip for reception of the liquefied metal from the containment means.

3. The brush assembly of claim 2, wherein the container includes a housing to which the pressure is applied and from which the tubular chambers project toward the moving surface, such that the liquefied metal is conducted from the container onto the moving surface under the pressure.

4. The brush assembly of claim 3, further including a base plate within the housing electrically interconnecting the tubular chambers.

5. The brush assembly of claim 1, wherein the container includes a housing to which the pressure is applied and from which the tubular chambers project toward the moving surface, such that the liquefied metal is conducted from the container onto the moving surface under the pressure.

6. The brush assembly of claim 5, wherein the tubular chambers each include an internal stem that extends to the tip for reception of the liquefied metal therein from the containment means.

7. The brush assembly of claim 1, further including a base plate within the containment means electrically interconnecting the tubular chambers.

8. Apparatus for enhancing transfer of electric current comprising:

sealed containment means for retention of a liquefied metal therein, the liquefied metal being drawn in and retained in the containment means under vacuum;

a plurality of brushes connected the containment means and exposed to the liquefied metal while being held in contact with a moving surface;

each of said brushes being made of a porous material and configured to conduct some of the liquefied metal from the containment means onto the moving surface during said contact thereof with said brushes upon an application of pressure to the containment means, wherein said brushes are tubular chambers having tips configured to deposit a liquefied metal drop onto the moving surface, and wherein the liquefied metal drop is held within the tip by surface tension and vacuum.

9. The apparatus defined in claim 1, wherein the tubular chambers each include an internal stem that extends to the tip for reception of the liquefied metal therein from the containment means.

10. The apparatus as defined in claim 9, wherein said containment means includes a housing to which said pressure is applied and within which the liquefied metal is sealingly enclosed under vacuum and from which the tubular chambers project toward the moving surface such that the liquefied metal is conducted from the containment means onto the moving surface under said pressure.

11. The apparatus as defined in claim 10, further including a base plate within the housing electrically interconnecting the tubular chambers.

12. The apparatus as defined in claim 1, wherein said containment means includes a housing to which said pressure is applied within which the liquefied metal is sealingly enclosed under vacuum and from which the tubular chambers project toward the moving surface such that the liquefied metal is conducted from the containment means onto the moving surface under said pressure.

13. The apparatus as defined in claim 12, wherein the tubular chambers each include an internal stem that extends to the tip for reception of the liquefied metal therein from the containment means.

14. The apparatus as defined in claim 1, further including a base plate within the containment means electrically interconnecting the tubular chambers.

* * * * *